US008867794B2

(12) United States Patent
Huang et al.

(10) Patent No.: US 8,867,794 B2
(45) Date of Patent: Oct. 21, 2014

(54) SYSTEMS AND METHODS FOR PERFORMING IMAGE INPAINTING BASED ON TEXTURE ANALYSIS

(71) Applicant: Cyberlink Corp., Shindian (TW)

(72) Inventors: Po-Yu Huang, New Taipei (TW); Chia-Chen Kuo, Taipei (TW); Ho-Chao Huang, New Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 219 days.

(21) Appl. No.: 13/658,273

(22) Filed: Oct. 23, 2012

(65) Prior Publication Data

US 2014/0112548 A1    Apr. 24, 2014

(51) Int. Cl.
*G06K 9/00*    (2006.01)
*G06K 9/40*    (2006.01)

(52) U.S. Cl.
USPC .......................................... 382/108; 382/254

(58) Field of Classification Search
CPC combination set(s) only.
See application file for complete search history.

(56) References Cited

U.S. PATENT DOCUMENTS

2007/0160309 A1    7/2007  Bertozzi et al.
2008/0170801 A1*   7/2008  Kozlov et al. ................. 382/275
2010/0074558 A1    3/2010  Lim
2011/0123113 A1    5/2011  Berretty et al.
2013/0223737 A1*   8/2013  Anbai et al. .................. 382/170

FOREIGN PATENT DOCUMENTS

CN    1731449      8/2006
CN    102142132    8/2011
CN    102231790    11/2011

OTHER PUBLICATIONS

Laurent Demanet et al. "Image Inpainting by Correspondence Maps: a Deterministic Approach" Aug. 16, 2003.
H. Noori et al. "A Convolution Based Image Inpainting" 1st International Conference on Communications Engineering, p. 130-134, Nov. 26, 2010.
M. Prasad et al. "Image Inpainting Using Texture Synthesis" International Journal of Electronics Communication and Computer Engineering, vol. 3, Issue (1), NCRTCST, ISSN 2249-071X.

* cited by examiner

*Primary Examiner* — Alex Liew
(74) *Attorney, Agent, or Firm* — McClure, Qualey & Rodack, LLP

(57) ABSTRACT

Various embodiments are disclosed for performing image inpainting. One embodiment is a method for editing a digital image in an image editing device. The method comprises obtaining a restoration region in the digital image and determining texture information corresponding to the restoration region. Based on the texture information, a texture strength map is generated corresponding to the restoration region. Based on the texture strength map, an inpainting operation is applied to pixels in the restoration region.

25 Claims, 14 Drawing Sheets

SYSTEMS AND METHODS FOR PERFORMING IMAGE INPAINTING BASED ON TEXTURE ANALYSIS

BACKGROUND

Over the years, digital content has gained increasing popularity with consumers. With the ever-growing amount of digital content available to consumers through the Internet using computers, smart phones, and other sources, consumers have access to a vast amount of content. Furthermore, many devices (e.g., smartphones) and services are readily available that allow consumers to capture and generate digital images.

The process of inpainting involves reconstructing lost or deteriorated parts of images and videos. Specifically, restoration algorithms are applied to replace portions of an image. A user, for example, may wish to remove one or more regions within an image containing objects or defects. Some inpainting techniques involve filling in the restoration region in the image by searching for similar patches in a nearby source region of the image and then copying the pixels from the most similar patch into the restoration region.

SUMMARY

Briefly described, one embodiment, among others, is a method for editing a digital image in an image editing device. The method comprises obtaining a restoration region in the digital image and determining texture information corresponding to the restoration region. Based on the texture information, a texture strength map is generated corresponding to the restoration region. Based on the texture strength map, an inpainting operation is applied to pixels in the restoration region.

Another embodiment is a system for editing a digital image. The system comprises a texture descriptor generator configured to determine texture descriptors corresponding to a restoration region within the digital image to undergo an inpainting operation. The system further comprises a texture strength map generator configured to generate a texture strength map corresponding to the restoration region based on the texture descriptors and an inpainting component configured to apply the inpainting operation to pixels in the restoration region based on the corresponding texture strength specified in the texture strength map.

Another embodiment is a method for editing a digital image in an image editing device. The method comprises obtaining a restoration region in the digital image and generating a texture strength map corresponding to the restoration region based on texture characteristics associated with pixels in the restoration region. The method further comprises determining a texture difference for pixels in the restoration region relative to the texture strength map and applying an inpainting operation to pixels in the restoration region according to the corresponding texture difference.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The process of inpainting involves reconstructing lost or deteriorated parts of images and videos. Specifically, restoration algorithms are applied to replace lost or corrupted portions of an image. Patch matching is a commonly used technique for inpainting. This technique works well in cases where the image exhibits regular texture and where the missing information resulting from removal of an object in the image can be reconstructed using suitable patches from information associated with areas in the image that is known (i.e., those areas outside the area to be restored). However, many images comprise unique, non-repetitive structures, and texture information associated with an image is typically not considered during the restoration process, thereby resulting in artifacts.

Various embodiments are disclosed for improving the quality of an image after performing image inpainting by analyzing and utilizing texture characteristics corresponding to the image during the reconstruction of image pixels in the restoration region. For some embodiments, a texture strength map is derived and applied during image inpainting in order to ensure textural continuity in the area being restored with respect to surrounding areas. One embodiment, among others, is a method for editing a digital image in an image editing device, where the method comprises obtaining a restoration region in the digital image. For example, the restoration region may be manually defined by a user wishing to remove an object from a digital image.

The method further comprises generating a texture strength map corresponding to the restoration region based on texture characteristics associated with pixels in the restoration region, where such texture characteristics as edge characteristics in the digital image, contrast level characteristics in the digital image, and spatial frequencies associated with the restoration region may be utilized to derive the texture strength map. The method further comprises determining a texture difference for pixels in the restoration region relative to the texture strength map and applying an inpainting operation to pixels in the restoration region according to the corresponding texture difference.

Figure 1:
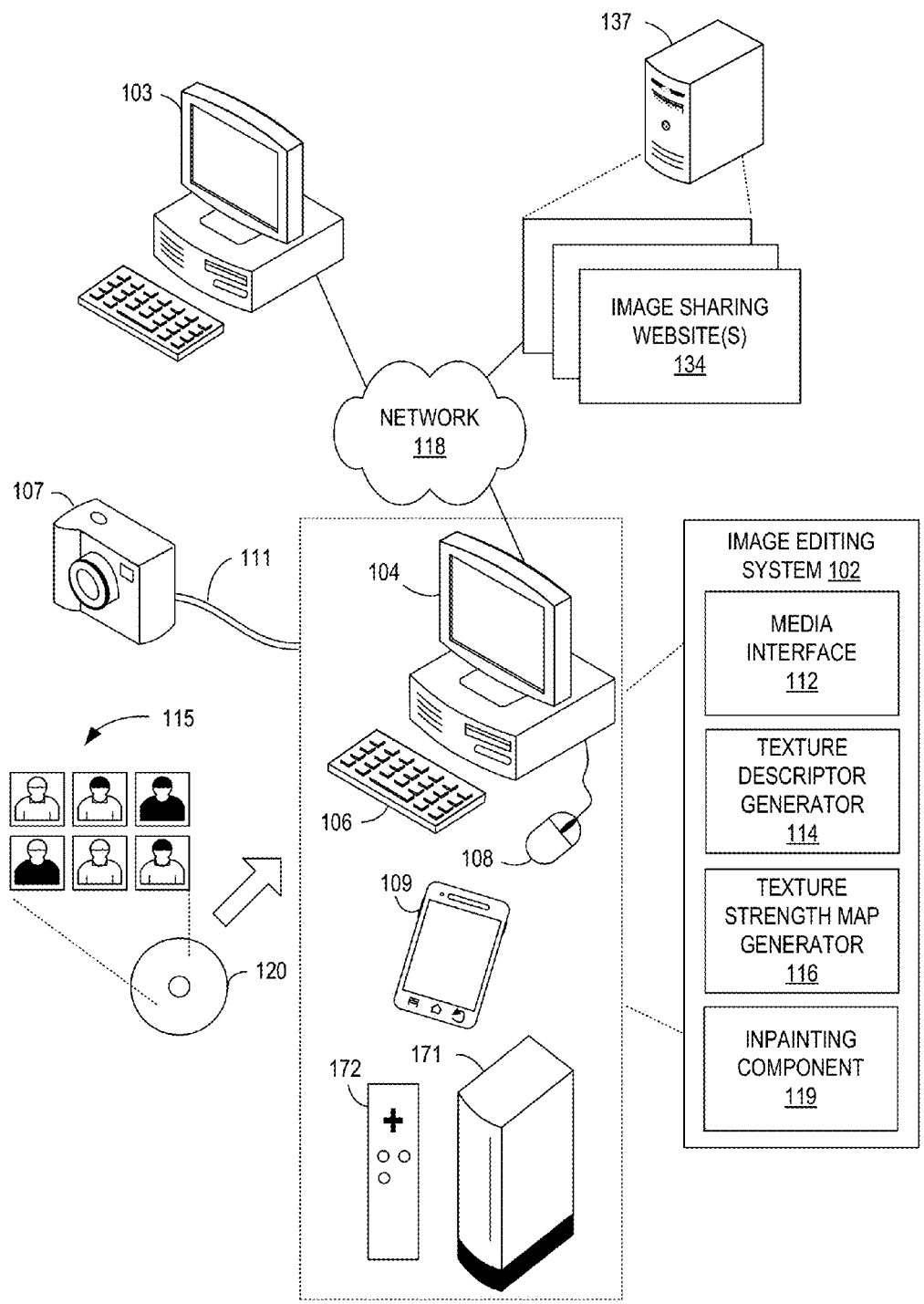
FIG. 1 is a block diagram of an image editing system for facilitating image inpainting in accordance with various embodiments of the present disclosure.

A description of a system for facilitating image inpainting is now described followed by a discussion of the operation of the components within the system. FIG. 1 is a block diagram of an image editing system 102 in which embodiments of the image processing techniques disclosed herein may be implemented. The image editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the image editing system 102 is embodied as a smartphone 109 or tablet, the user may interface with the image editing system 102 via a touchscreen interface (not shown). In other embodiments, the image editing system 102 may be embodied as a video gaming console 171, which includes a video game controller 172 for receiving user preferences. For such embodiments, the video gaming console 171 may be connected to a television (not shown) or other display 104.

The image editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the image editing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

As depicted in FIG. 1, the media interface 112 in the image editing system 102 may also be configured to retrieve digital media content 115 directly from a digital camera 107 where a cable 111 or some other interface may be used for coupling the digital camera 107 to the image editing system 102. The image editing system 102 may support any one of a number of common computer interfaces, such as, but not limited to, IEEE-1394 High Performance Serial Bus (Firewire), USB, a serial connection, and a parallel connection.

The digital camera 107 may also be coupled to the image editing system 102 over a wireless connection or other communication path. The image editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image editing system 102 may receive digital media content 115 from another computing system 103. Alternatively, the image editing system 102 may access one or more image sharing websites 134 hosted on a server 137 via the network 118 to retrieve digital media content 115.

The texture descriptor generator 114 in the image editing system 102 is configured to analyze and identify textural attributes of the media content 115 retrieved by the media interface 112 in order to facilitate image inpainting of the media content 115 for editing purposes. For some embodiments, the texture descriptor generator 114 is configured to determine texture information corresponding to the restoration region, where such texture information may be based on, for example, edge characteristics, contrast level characteristics, spatial frequencies associated with the restoration region, etc. found in the media content 115 being edited.

The texture strength map generator 116 is configured to generate a texture strength map corresponding to the restoration region based on the texture information derived by the texture descriptor generator 114, the texture strength map represents a correlation between texture characteristics of every pixel within the restoration region and texture characteristics of every pixel on the boundary of the restoration region. The correlation in texture characteristics between a given restoration region pixel and a given boundary pixel may be represented by the distance between these two pixels. Note, however, that metrics other than absolute distance may be utilized as well for characterizing the correlation. Based on the texture strength map, the inpainting component 119 then performs image inpainting such the inpainting technique (e.g., patch matching) is performed based on an area outside the restoration region that exhibits similar texture characteristics.

Figure 2:
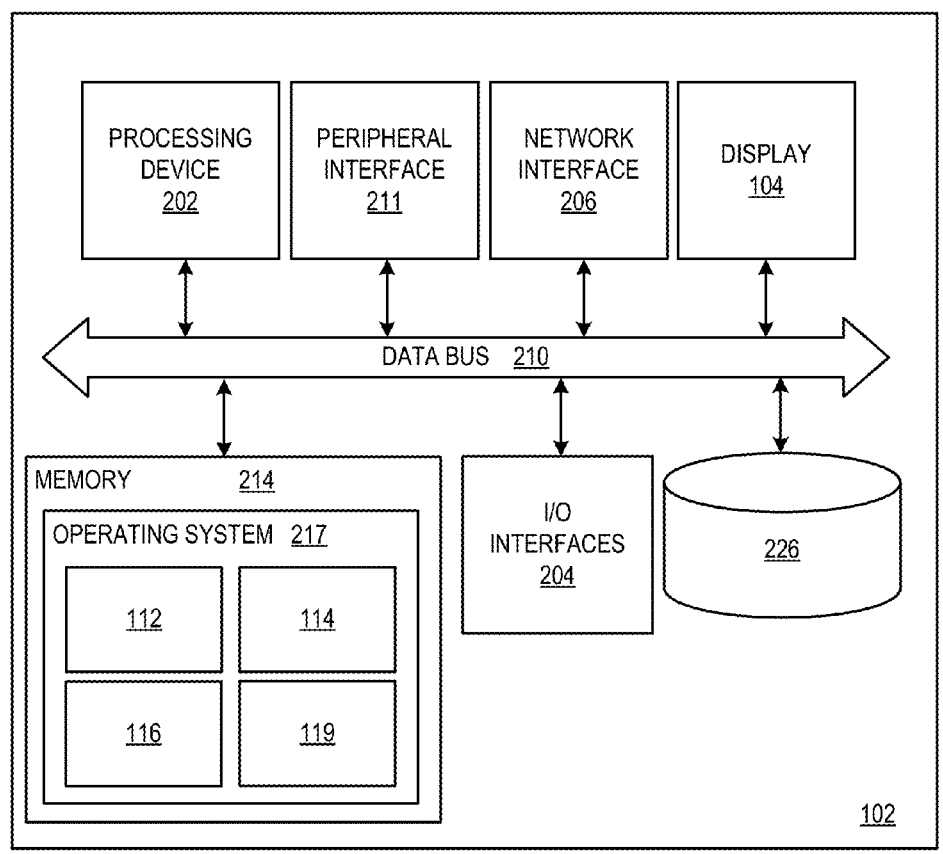
FIG. 2 is a detailed view of the image editing system device of FIG. 1 in accordance with various embodiments of the present disclosure.

FIG. 2 is a schematic diagram of the image editing system 102 shown in FIG. 1. The image editing system 102 may be embodied in any one of a wide variety of wired and/or wireless computing devices, such as a desktop computer, portable computer, dedicated server computer, multiprocessor computing device, smartphone 109, tablet computing device, and so forth. As shown in FIG. 2, the image editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, texture descriptor generator 114, texture strength map generator 116, inpainting component 119) of the image editing system 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the image editing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image editing system 102 may communicate with one or more computing devices via the network interface 206 over the network 118 (FIG. 1). The image editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
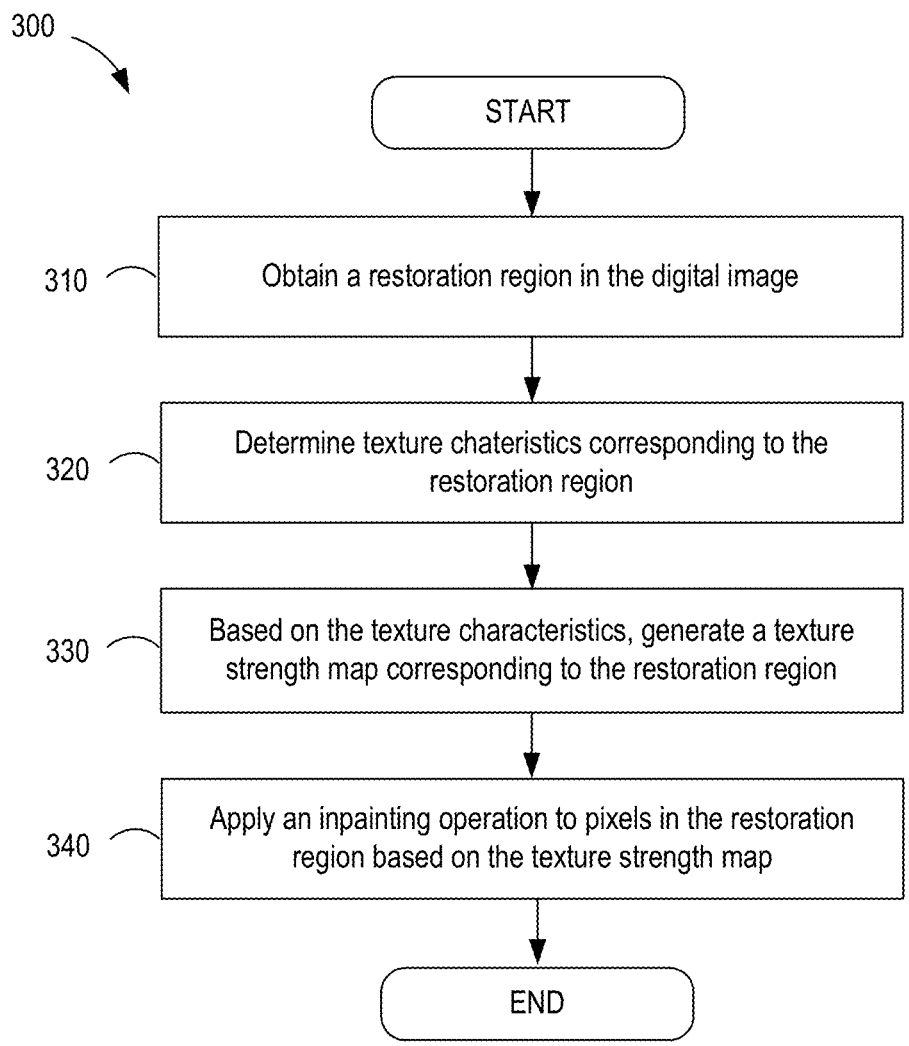
FIG. 3 is a top-level flowchart illustrating examples of functionality implemented as portions of the image editing device of FIG. 1 for facilitating image inpainting according to various embodiments of the present disclosure.

Reference is made to FIG. 3, which is a flowchart 300 in accordance with one embodiment for facilitating image inpainting of a digital image based on textural information contained in the digital image. It is understood that the flowchart 300 of FIG. 3 provides merely an example of the many different types of functional arrangements that may be employed to implement the operation of the various components of the image editing system 102 (FIG. 1). As an alternative, the flowchart of FIG. 3 may be viewed as depicting an example of steps of a method implemented in the image editing system 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Beginning with block 310, the image editing system 102 obtains a restoration region in a digital image obtained by the media interface 112 (FIG. 1). The restoration region may correspond to one or more objects that a user of the image editing system 102 wishes to remove from the digital image. As discussed earlier, the digital image may be received by the media interface 112 from a storage medium 120 (FIG. 1) or other source such as a digital camera 107 (FIG. 1), image sharing website 134 (FIG. 1), etc.

In block 320, the texture descriptor generator 114 (FIG. 1) in the image editing system 102 analyzes and identifies attributes of the media content 115 (FIG. 1) retrieved by the media interface 112 to determine textural information corresponding to the restoration region relative to areas surrounding the restoration region. For some embodiments, textural information corresponding to the restoration region is embodied as texture descriptors derived based on such information as edge characteristics in the digital image, contrast level characteristics in the digital image, and spatial frequencies associated with the restoration region in the digital image being edited. As described in more detail below, texture attributes corresponding to regions both within the restoration region and outside the restoration region are analyzed in order to ensure textural consistency during the image inpainting process.

In block 330, the texture strength map generator 116 (FIG. 1) generates a texture strength map corresponding to the restoration region based on the texture information derived by the texture descriptor generator 114. In block 340, based on the texture strength map, the inpainting component 119 (FIG. 1) performs image inpainting based on the texture strength of pixels within the restoration region as defined in the texture strength map. In general, image inpainting is performed such that the texture strength of the inpainted region closely matches the texture strength specified in the texture strength map for the corresponding region.

Figure 4:
FIGS. 4 and 5 depict an example digital image to be processed by the image editing system of FIG. 1 in accordance with various embodiments of the present disclosure.

To further illustrate the various concepts disclosed, reference is made to FIGS. 4-11, which illustrate various aspects of image inpainting in accordance with various embodiments of the present disclosure. Shown in FIG. 4 is an example of a digital image 402, which the user wishes to edit. As shown in the line drawing representation in FIG. 5, the digital image 402 includes both low texture areas and high texture areas.

Figure 5:
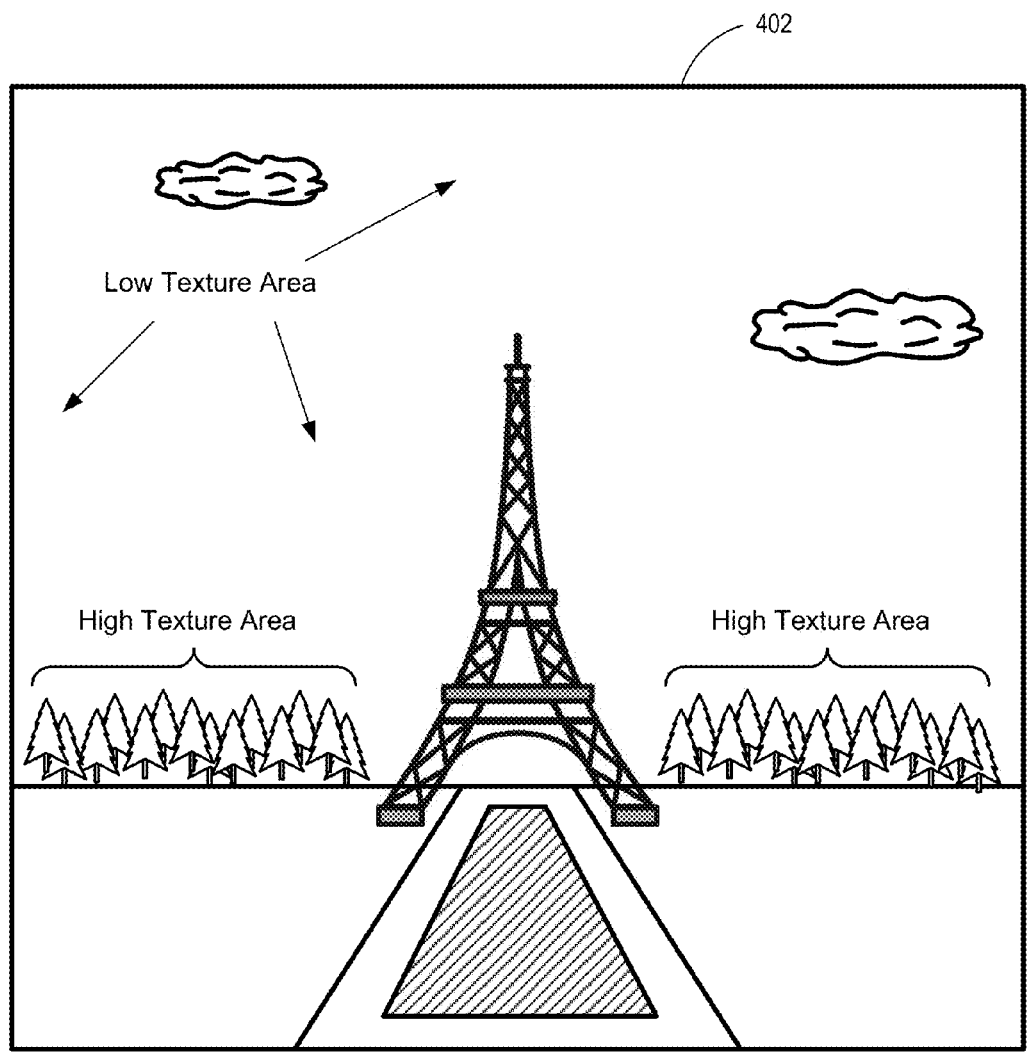
Figure 6:
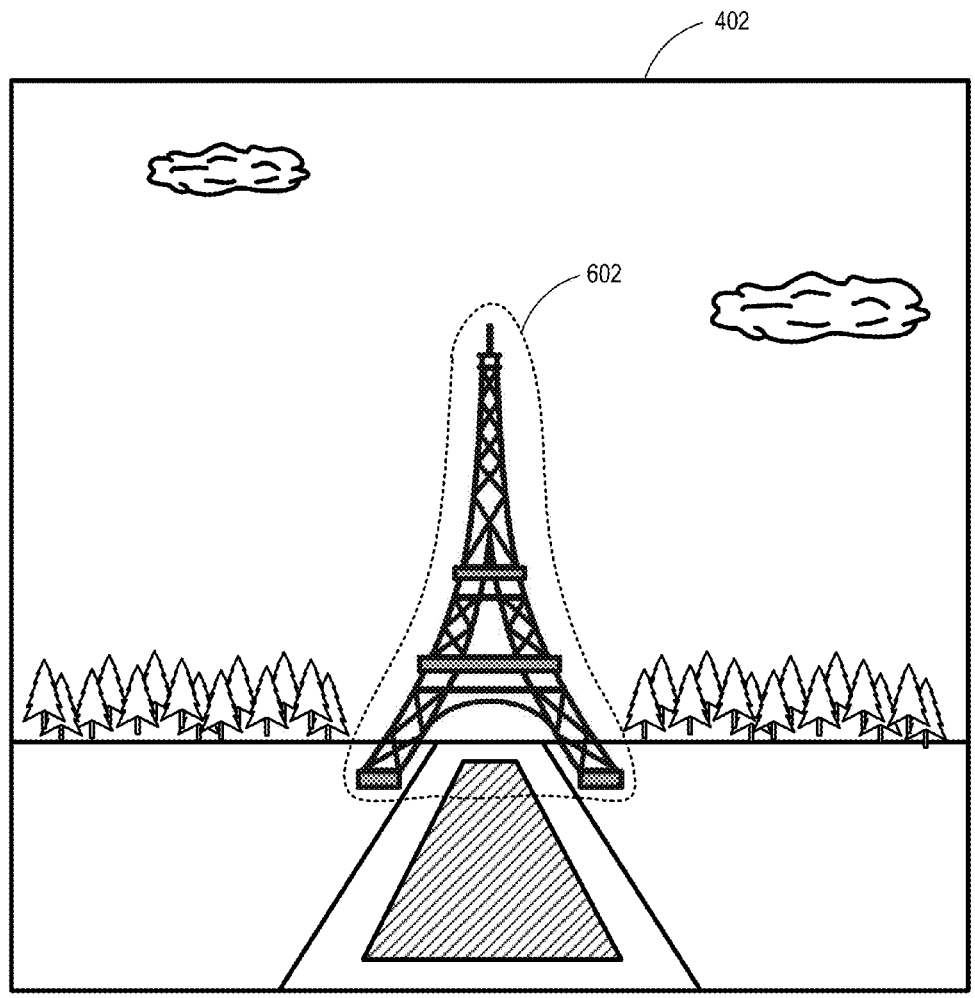
FIG. 6 depicts an example of a restoration region for image inpainting performed by the image editing system of FIG. 1 in accordance with various embodiments of the present disclosure.

As shown in FIG. 5, the high texture areas include, for example, areas containing trees near the base of the Eiffel Tower, whereas the low texture area includes, for example, the background portion of the digital image (e.g., the sky). With reference to FIG. 6, assume, for purposes of illustration, that the restoration region 602 encompasses the Eiffel Tower and that a user wishes to remove the Eiffel Tower from the digital image 402 and inpaint this region 602.

As discussed earlier, patch matching is a commonly used technique in image inpainting systems, where the missing information resulting from removal of an object (i.e., the Eiffel Tower in FIG. 5) from the digital image 402 is reconstructed using suitable patches from information associated with areas in the image that is known (i.e., those areas outside the area to be restored). Based on the patches found in portions outside of the restoration region, the restoration region is filled by copying or blending pixels from the identified patches.

Figure 12:
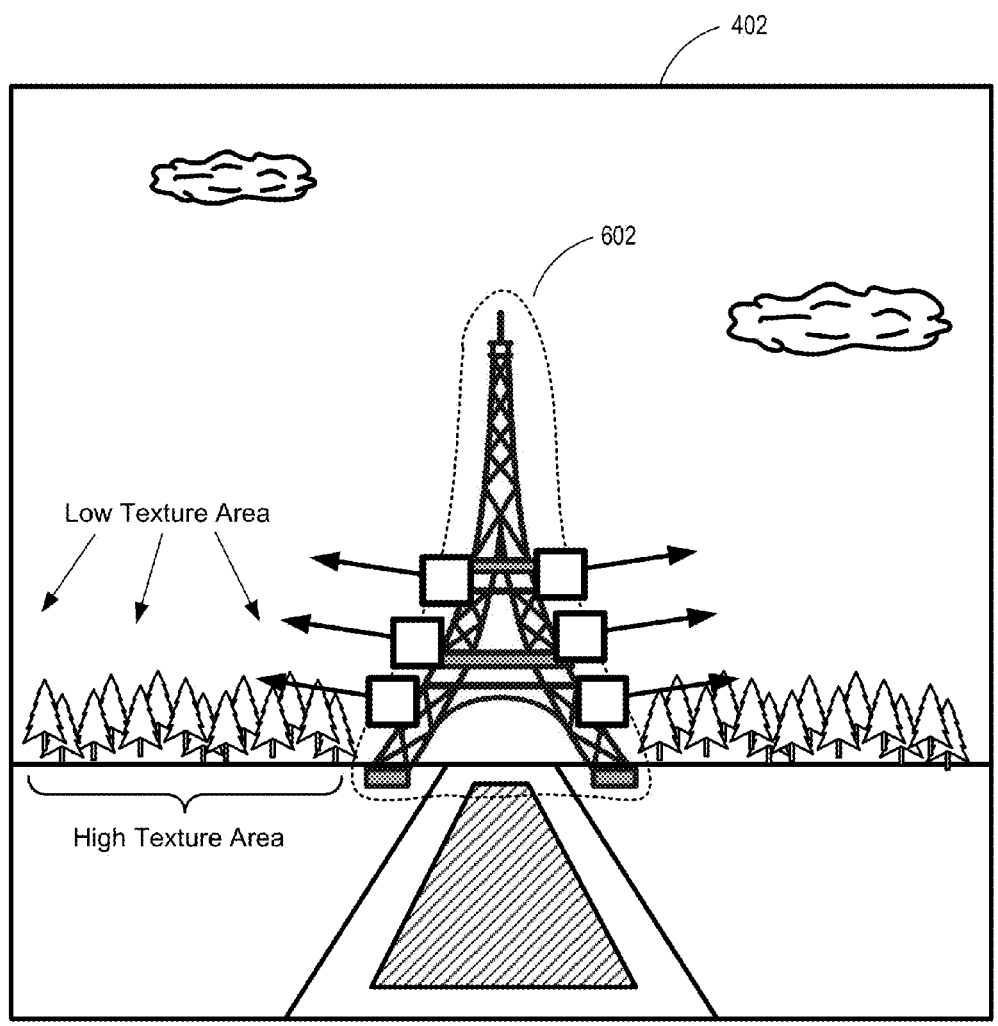
FIG. 12 illustrates the concept of patch matching for performing image inpainting.
Figure 13:
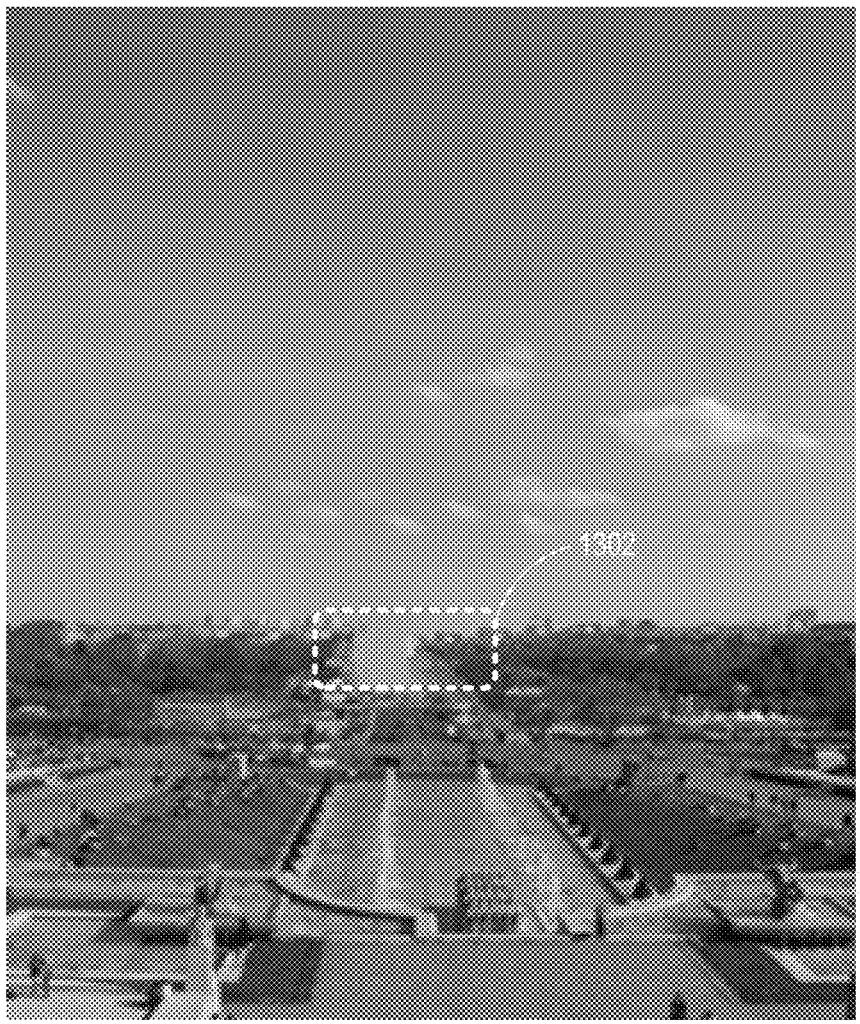
FIG. 13 illustrates the result of an image inpainting operation utilizing the patch matching technique illustrated in FIG. 12.

As shown in the example in FIG. 12, however, patches may span the background and other low texture areas as textural consistency is typically not taken into consideration during the inpainting process. FIG. 13 illustrates the result of image inpainting based on a patch matching technique where textural consistency is not taken into consideration. As shown, the lower portion 1302 of the restoration region includes a portion that includes the background (i.e., the sky) as patches spanning the background were utilized to inpaint a portion of the lower portion 1302 of the restoration region. As a result, a noticeable gap is seen in the picture as a result of an inpainting operation performed based on a patch located in the background (i.e., the sky). The image inpainting techniques disclosed herein take into consideration the textural attributes of pixels both inside and outside the restoration in order to ensure textural continuity.

Referring back to FIG. 6, the image editing system 102 (FIG. 1) obtains user input specifying a restoration region 602 surrounding the object that the user wishes to remove. The user may, for example, utilize a mouse 108 (FIG. 1) or other pointer device to manually draw a boundary around the object to be removed, thereby defining a restoration region 602. The restoration region 602 may also be obtained via a touchscreen interface.

Upon retrieving a restoration region 602, the texture descriptor generator 114 (FIG. 1) in the image editing system 102 analyzes and identifies attributes of the digital image 402 to determine texture information corresponding to the restoration region 602. Specifically, the texture descriptor generator 114 identifies attributes corresponding to pixels on the boundary of the restoration region as well as attributes corresponding to pixels within the restoration region.

For some embodiments, the texture information is derived in the form of texture descriptors based on such attributes as edge characteristics in the digital image, contrast level characteristics in the digital image, spatial frequencies associated with the restoration region, etc. found in the digital image 402. Textural attributes corresponding to objects both within the restoration region and outside the restoration region are derived based on edge detection and/or other image details in order to ensure structural continuity during the image inpainting process.

Figure 7A:
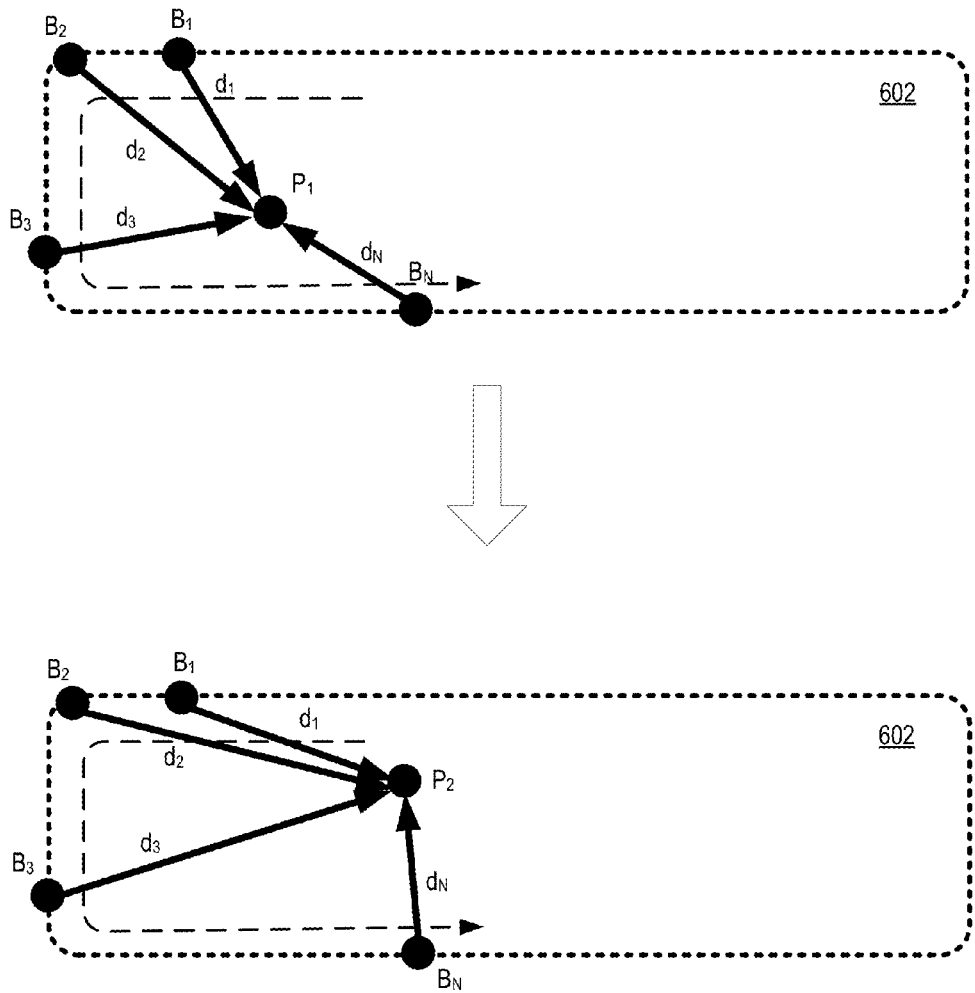
FIGS. 7A and 7B illustrate concepts relating to pixel gradients for deriving texture descriptors for pixels in the restoration region in accordance with various embodiments of the present disclosure.

Reference is made to FIG. 7A, which illustrates derivation of texture descriptors in accordance with various embodiments. For implementations where edge detection is utilized, texture descriptors are derived that determine the correlation in textural attributes for a point "B" and a point "P," wherein point B represents a pixel located on the boundary of the restoration region 602 and point P represents a pixel within the restoration region 602. In accordance with various embodiments, the correlation is determined for pixels in the restoration region 602 (point P) relative to a pixel gradient formed with respect to every pixel (point B) along the boundary. That is, determining texture information comprises determining a pixel gradient corresponding to pixels on a boundary of the restoration region relative to a common restoration region pixel, where this operation is performed for restoration region pixels. Finally, the texture descriptor for a given restoration region pixel comprises a sum of the pixel gradients of the restoration region formed with respect to that restoration region pixel.

For example, for a given point P (e.g., point $P_1$), a pixel gradient is determined with respect to pixels on the boundary of the restoration region (Point $B_{1\ to\ N}$). That is, for a given point P, pixel gradients are derived for pixels (point $B_{1\ to\ N}$) on or adjacent to the boundary of the restoration region such that pixel gradients are formed for a boundary pixel (point B) relative to a common point P (e.g., point $P_1$), as illustrated in FIG. 7A. For some embodiments, the pixel gradients are derived by calculating the variance of neighboring pixels relative to pixels on or near the boundary as the variance of a high-texture region is typically higher than a smooth region. For such embodiments, the texture strength map for the restoration region is derived based on the variance of boundary region. Once the pixel gradients have been derived by the texture descriptor generator 114 (FIG. 1), a correlation between each point B and a point P is determined with respect to textural characteristics by summing the pixel gradients and performing a weighting operation. The process is repeated for the next restoration region pixel (e.g., point $P_2$).

As described above, a texture descriptor is determined for every pixel in the restoration region, where each texture descriptor is calculated according to the following expression:

$$T_i = \frac{\sum_{b=1}^{n} [W(d(Pi,\ Pb)) \times Tb]}{\sum_{b=1}^{n} W(d(Pi,\ Pb))}.$$

In the expression above, $T_i$ represents the texture descriptor for the $i^{th}$ restoration region pixel in the restoration region, where i is less than or equal to a total number of restoration region pixels. The function d(Pi, Pb) represents a distance between an $i^{th}$ restoration region pixel and a $b^{th}$ boundary pixel. The function W( ) represents a function which determines a weight of Tb based on the distance, where Tb represents texture characteristics for the $b^{th}$ boundary pixel, and where n is less than or equal to a total number of boundary pixels surrounding the restoration region.

For some embodiments, the function W( ) may be calculated according to the following expression:

$$W(x) = e^{\left(\frac{-x}{c}\right)}.$$

In the expression above, x is equal to the function d(Pi,Pb), and C is a normalization term equal to the minimum value between a digital image width and digital image height. For example, for a 6 megapixel image with an image width value of 3,000 and an image height value of 2,000, the value of C would be assigned a value of 2,000. Note that the exponential term results in significantly higher weight values for boundary pixels that are closer to the restoration region pixel. The parameter Tb represents texture characteristics for the $b^{th}$ boundary pixel. Finally, n represents a total number of boundary pixels surrounding the restoration region. For other embodiments, the function W( ) may be calculated according to the following:

$$W(x) = \frac{1}{x^n},$$

where x is equal to the function d(Pi, Pb), and where n represents an order term greater than zero.

Figure 7B:
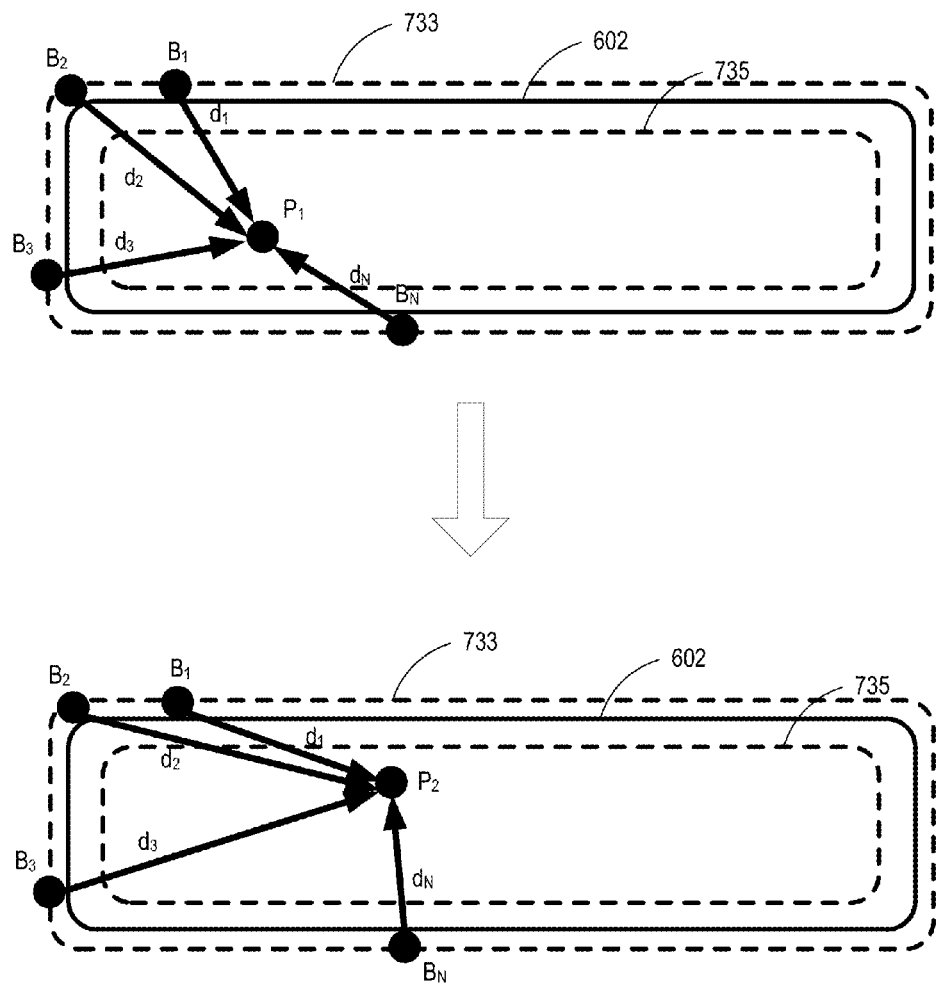

The texture descriptors for all the restoration region pixels are then aggregated to form the texture strength map such that a texture strength value is assigned for restoration region pixels. FIG. 7B illustrates the derivation of texture descriptors using pixels near the pixels on the boundary of the restoration region 602. As shown, the pixels on a region 733 surrounding the boundary 602 are evaluated. The distance between the surrounding region 733 and the boundary 602 may comprise one or more pixels, and the distance may vary such that the surrounding region 733 is not limited to the same number of pixels apart from the boundary 602.

Note that pixels within the boundary 602 of the restoration region may also be utilized, as shown by the inner region 735 in FIG. 7B. In this regard, pixels near the boundary 602 of the restoration region may comprise pixels outside of the boundary 602 and/or pixels inside the boundary 602. Note also that for some embodiments, both pixels near and on the boundary 602 may be utilized for deriving texture descriptors.

Figure 8:
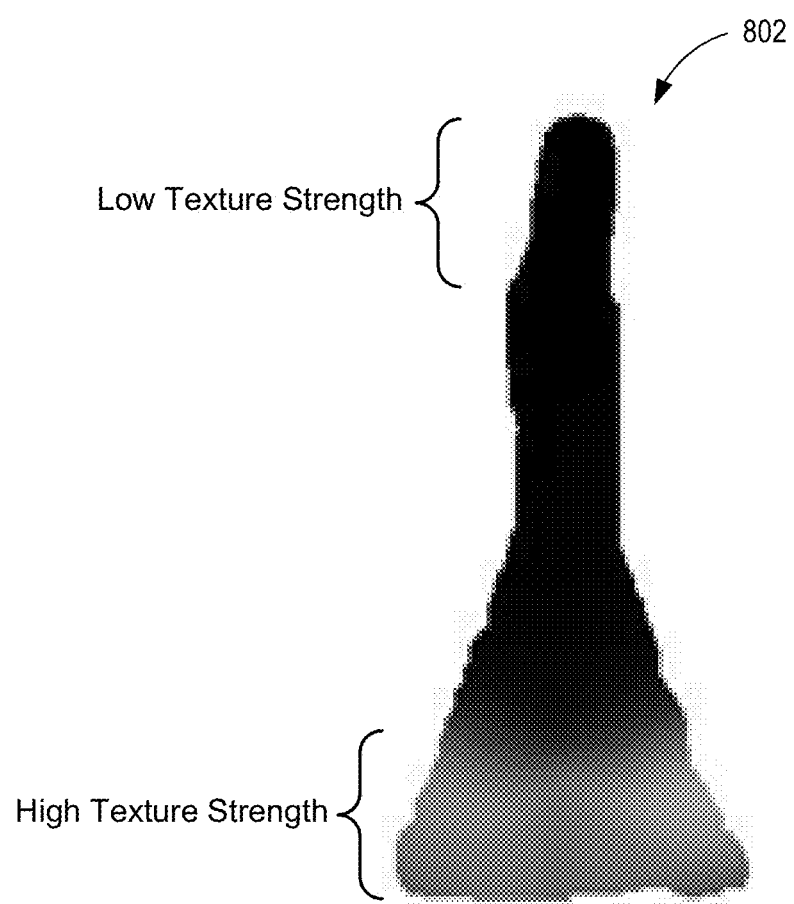
FIG. 8 illustrates an example of a texture strength map derived by the image editing system of FIG. 1 in accordance with various embodiments of the present disclosure.

Reference is made to FIG. 8, which illustrates an example of a texture strength map 802 derived for the restoration region 602 (FIG. 6). The lighter portions of the texture strength map 802 represent portions of the restoration region 602 where the immediate surrounding areas (i.e., those areas outside the restoration region) exhibit a high degree of texture. The darker portions of the texture strength map 802 represent portions of the restoration region 602 where the areas surrounding the restoration region 602 exhibit a low degree of texture.

Figure 9:
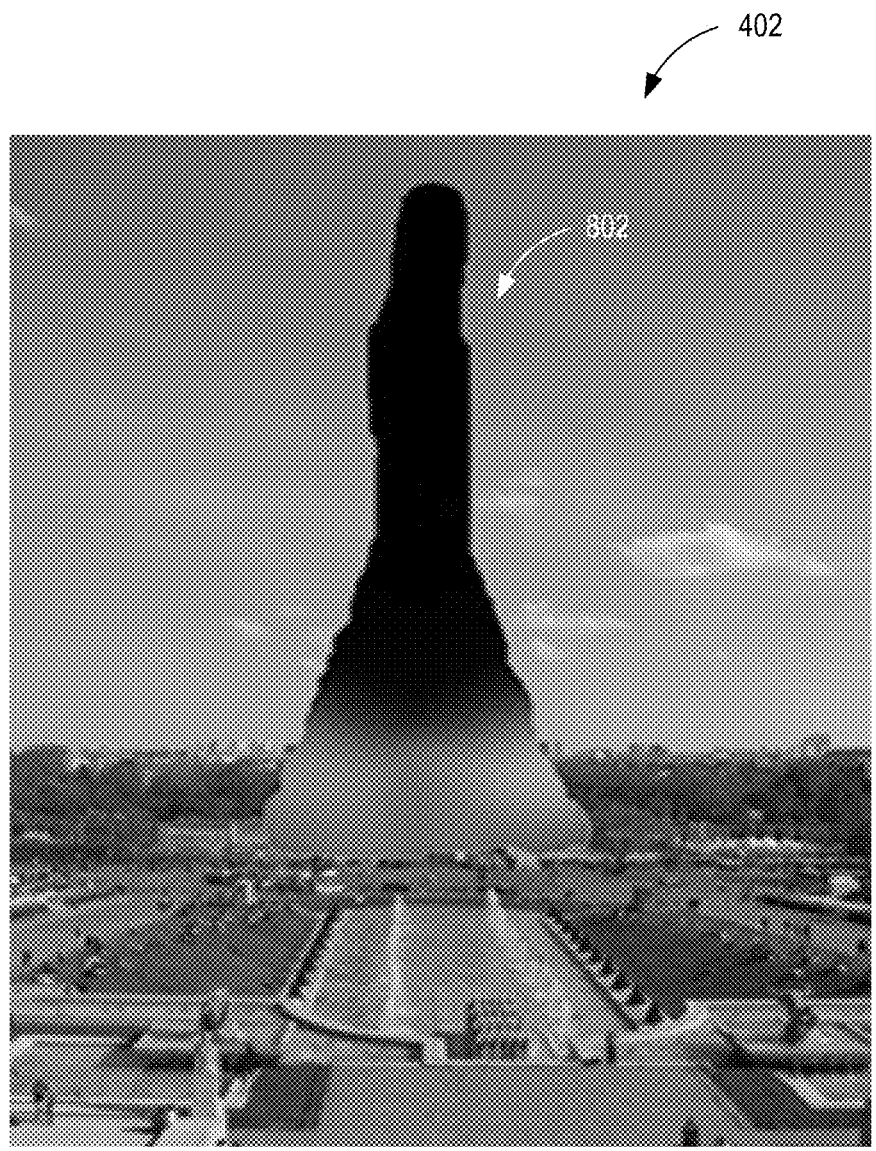
FIG. 9 and FIG. 10 illustrate use of the texture strength map for performing an inpainting operation in accordance with various embodiments of the present disclosure.
Figure 10:
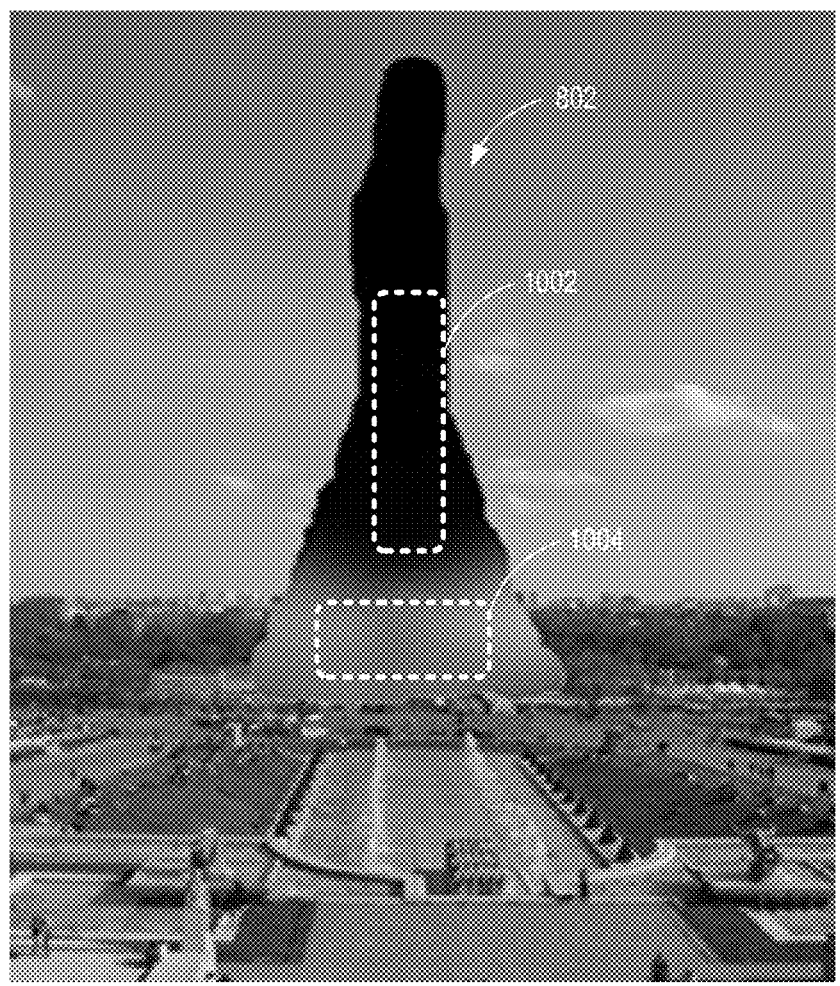

To further illustrate, reference is made to FIG. 9, which shows the texture strength map 802 in the digital image 402, where the texture strength map 802 corresponds to the restoration region 602 (FIG. 6). As further illustrated in FIG. 10, the portion 1004 near the bottom of the texture strength map 802 exhibits high texture strength whereas the portion 1002 above exhibits low texture strength. That is, pixels in the lower portion 1004 exhibit a high correlation with boundary pixels that exhibit a high degree of texture. Pixels in the upper portion 1002 exhibit a high correlation with boundary pixels that exhibit a low degree of texture.

To further illustrate, suppose that the texture strength of the current restoration region pixel is a value S. For some embodiments, a patch with a texture strength value ranging from (0.5×S) to (1.5×S) is identified for patching matching purposes. However, if a patch cannot be found that matches this criteria, a patch with a texture strength value as close to S is then selected.

For some embodiments, an inpainting operation is applied to pixels in the restoration region based on one or more minimal difference values in the texture strength between the texture of the current restoration region pixel and a region outside of the restoration region. For some embodiments, the order statistics of the minimal differences is derived to determine the order of the minimal difference values in which to utilize.

To illustrate, consider a scenario where the texture strength value of a current restoration region pixel is 100. Assume, for purposes of this illustration, that the texture strength values of five regions outside the restoration region are 70, 90, 98, 105, and 111. A first minimal difference may be determined to be 98 based on the calculation (100−98=2), where this first minimal difference is applied during the patch matching operation. However, a second minimal difference of 105 based on the calculation (105−100=5) may also be applied during the patch matching operation. Similarly, a third minimal difference of 90 based on the calculation (100−90=10) may also be applied during the patch matching operation, and so on.

Figure 11:
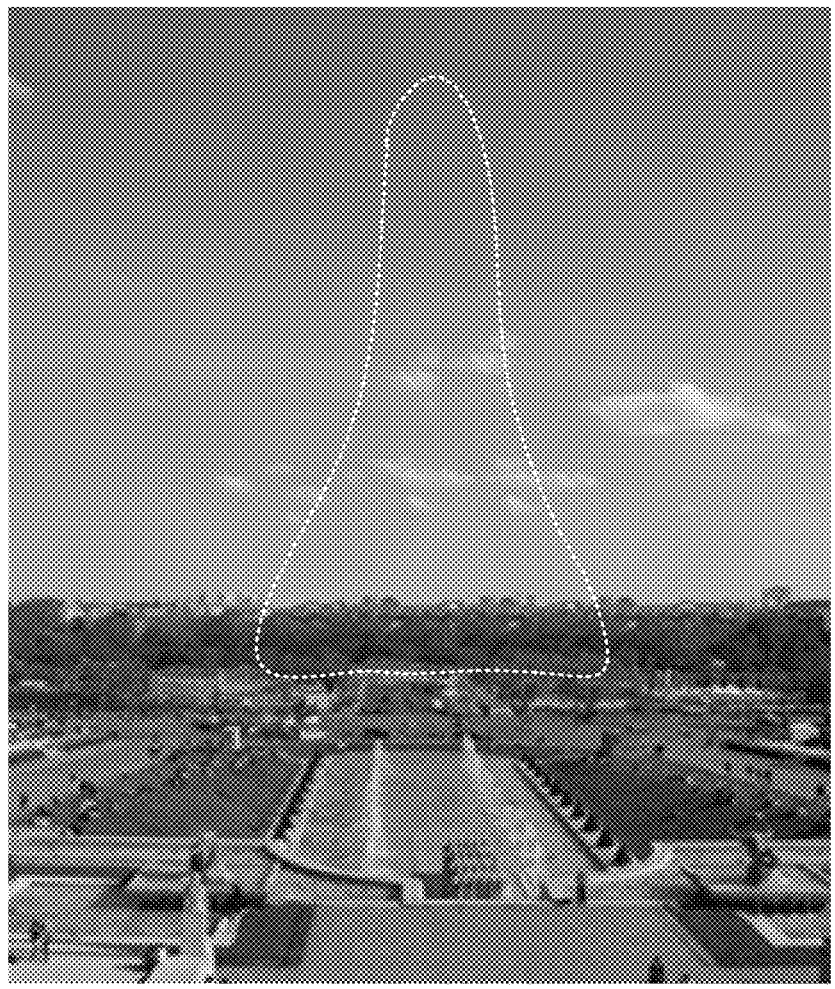
FIG. 11 illustrates the result of an image inpainting operation performed by the image editing system in FIG. 1 in accordance with various embodiments of the present disclosure.

In this regard, one or more minimal difference values may be applied, where the one or more minimal differences is selected from a plurality of minimal differences ordered according to an order statistics distribution. Thus, applying an inpainting operation to pixels in the restoration region based on the texture strength map may comprise applying, for the restoration region pixel, a patch matching operation to a current restoration region pixel based on at least one $n^{th}$ order statistic difference in texture strength between the texture of the current restoration region pixel and a region outside of the restoration region, where the at least one $n^{th}$ order statistic difference is selected from a plurality of differences ordered according to an order statistics distribution, and wherein n is a sample size of differences. For example, only the second minimal difference might be used while in other scenarios, a first minimal difference and a second minimal difference might be used. FIG. 11 shows the result of inpainting utilizing the texture strength map 802 (FIG. 8). As shown, the texture of both the top and bottom portions of the restoration region is consistent with the texture of the surrounding areas, in contrast with the example shown in FIG. 13.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for editing a digital image in an image editing device, comprising:
   obtaining a restoration region in the digital image;
   determining texture information corresponding to the restoration region;
   based on the texture information, generating a texture strength map corresponding to the restoration region; and
   based on the texture strength map, applying an inpainting operation to pixels in the restoration region;
   wherein applying an inpainting operation to pixels in the restoration region based on the texture strength map comprises applying, for the restoration region pixel, a patch matching operation to a current restoration region pixel based on at least one $n^{th}$ order statistic difference in texture strength between the texture of the current restoration region pixel and a region outside of the restoration region, wherein the at least one $n^{th}$ order statistic difference is selected from a plurality of differences ordered according to an order statistics distribution, and wherein n is a sample size of differences.

2. The method of claim 1, wherein the restoration region is obtained via user input, wherein the user input corresponds to an object in the digital image.

3. The method of claim 1, wherein determining texture information comprises determining pixel gradients of at least one of:
   pixels near a boundary of the restoration region; and
   pixels on the boundary of the restoration region,
   wherein the pixel gradients are determined relative to a common restoration region pixel.

4. The method of claim 1, wherein determining texture information comprises computing a texture descriptor for a restoration region pixel in the restoration region, wherein each texture descriptor comprises a sum of pixel gradients of at least one of:
   pixels near a boundary of the restoration region; and
   pixels on the boundary of the restoration region,
   wherein the pixel gradients are determined relative to the restoration region pixel.

5. The method of claim 4, wherein the sum of the pixel gradients is weighted according to a spatial relationship between the restoration region pixel and at least one of:
   pixels near a boundary of the restoration region; and
   pixels on the boundary of the restoration region.

6. The method of claim 4, wherein generating a texture strength map corresponding to the restoration region based on the texture information comprises aggregating the texture descriptors for at least one restoration region pixel.

7. The method of claim 1, wherein applying an inpainting operation to pixels in the restoration region based on the texture strength map comprises applying, for the restoration region pixel, a patch matching operation to a current restoration region pixel based on a minimal difference in texture strength between the texture of the current restoration region pixel and a region outside of the restoration region.

8. The method of claim 1, wherein applying an inpainting operation to pixels in the restoration region based on the texture strength map comprises applying, for the restoration region pixel, a patch matching operation to a current restoration region pixel based on the difference of texture strength between the texture of the current restoration region pixel and a region outside of the restoration region, where the difference is lower than a predetermined threshold.

9. The method of claim 1, wherein determining texture information comprises computing a texture descriptor for a restoration region pixel in the restoration region, wherein each texture descriptor is calculated according to the following:

$$T_i = \frac{\sum_{b=1}^{n}[W(d(Pi, Pb)) \times Tb]}{\sum_{b=1}^{n} W(d(Pi, Pb))},$$

wherein $T_i$ represents the texture descriptor for the $i^{th}$ restoration region pixel, where i is less than or equal to a total number of restoration region pixels;
wherein d(Pi, Pb) represents a distance between an $i^{th}$ restoration region pixel and a $b^{th}$ boundary pixel;
wherein W( ) represents a function for determining a weight of Tb based on the distance;
wherein Tb represents texture characteristics for the $b^{th}$ boundary pixel; and
wherein n is less than or equal to a total number of boundary pixels surrounding the restoration region.

10. The method of claim 9, wherein W( ) is calculated according to the following:

$$W(x) = e^{\left(\frac{-x}{c}\right)},$$

wherein x is equal to the function d(Pi,Pb), and wherein C is a normalization term equal to the minimum value between a digital image width and digital image height.

11. The method of claim 9, wherein W( ) is calculated according to the following:

$$W(x) = \frac{1}{x^n},$$

wherein x is equal to the function d(Pi, Pb), and wherein n is an order term greater than zero.

12. A system for editing a digital image, comprising:
a texture descriptor generator configured to determine texture descriptors corresponding to a restoration region within the digital image to undergo an inpainting operation;
a texture strength map generator configured to generate a texture strength map corresponding to the restoration region based on the texture descriptors; and
an inpainting component configured to apply the inpainting operation to pixels in the restoration region based on the corresponding texture strength specified in the texture strength map;

wherein the inpainting component is configured to apply an inpainting operation to pixels in the restoration region based on the texture strength map by applying, for the restoration region pixel, a patch matching operation to a current restoration region pixel based on at least one $n^{th}$ order statistic difference in texture strength between the texture of the current restoration region pixel and a region outside of the restoration region, wherein the at least one $n^{th}$ order statistic difference is selected from a plurality of differences ordered according to an order statistics distribution, and wherein n is a sample size of differences.

13. The system of claim 12, wherein the texture descriptors comprise pixel gradients of at least one of:
pixels near a boundary of the restoration region; and
pixels on the boundary of the restoration region,
wherein the pixel gradients are determined relative to the restoration region pixel.

14. The system of claim 12, wherein the texture descriptor generator determines, for pixels in the restoration region, a texture descriptor for a restoration region pixel in the restoration region, wherein each texture descriptor comprises a sum of pixel gradients of at least one of:
pixels near a boundary of the restoration region; and
pixels on the boundary of the restoration region,
wherein the pixel gradients are determined relative to the restoration region pixel.

15. The system of claim 14, wherein the sum of the pixel gradients is weighted according to a spatial relationship between the restoration region pixel and at least one of:
pixels near a boundary of the restoration region; and
pixels on the boundary of the restoration region.

16. The system of claim 12, wherein the texture strength map generator is configured to generate a texture strength map corresponding to the restoration region based on the texture information by aggregating the texture descriptors for at least one restoration region pixel.

17. The system of claim 12, wherein the inpainting component is configured to apply an inpainting operation to pixels in the restoration region based on the texture strength map by applying, for the restoration region pixel, a patch matching operation to a current restoration region pixel based on a minimal difference in texture strength between a texture of the current restoration region and a region outside of the restoration region.

18. A method for editing a digital image in an image editing device, comprising:
obtaining a restoration region in the digital image;
generating a texture strength map corresponding to the restoration region based on texture characteristics associated with pixels in the restoration region;
determining a texture difference for pixels in the restoration region relative to the texture strength map; and
applying an inpainting operation to pixels in the restoration region according to the corresponding texture difference;
wherein applying an inpainting operation to pixels in the restoration region based on the texture strength map comprises applying, for the restoration region pixel, a patch matching operation to a current restoration region pixel based on at least one $n^{th}$ order statistic difference in texture strength between the texture of the current restoration region pixel and a region outside of the restoration region, wherein the at least one $n^{th}$ order statistic difference is selected from a plurality of differences ordered according to an order statistics distribution, and wherein n is a sample size of differences.

19. The method of claim 18, wherein generating the texture strength map comprises:

determining a texture descriptor for a restoration region pixel in the restoration region, wherein each texture descriptor is calculated according to the following:

$$T_i = \frac{\sum_{b=1}^{n}[W(d(Pi, Pb)) \times Tb]}{\sum_{b=1}^{n} W(d(Pi, Pb))},$$

wherein $T_i$ represents the texture descriptor for the $i^{th}$ restoration region pixel in the restoration region, where i is less than or equal to a total number of restoration region pixels; wherein d(Pi, Pb) represents a distance between an $i^{th}$ restoration region pixel and a $b^{th}$ boundary pixel; wherein W( ) represents a function which determines a weight of Tb based on the distance; wherein Tb represents texture characteristics for the $b^{th}$ boundary pixel; wherein n is less than or equal to a total number of boundary pixels surrounding the restoration region; and aggregating the texture descriptors to form the texture strength map.

20. The method of claim 19, wherein W( ) is calculated according to the following:

$$W(x) = e^{(\frac{-x}{c})},$$

wherein x is equal to the function d(Pi,Pb), and wherein C is a normalization term equal to the minimum value between a digital image width and digital image height.

21. The method of claim 19, wherein W( ) is calculated according to the following:

$$W(x) = \frac{1}{x^n},$$

wherein x is equal to the function d(Pi, Pb), and wherein n is an order term greater than zero.

22. The method of claim 18, wherein generating the texture strength map comprises:

determining pixel gradients of at least one of: pixels near a boundary of the restoration region; and pixels on the boundary of the restoration region, wherein the pixel gradients are determined relative to the restoration region pixel;

computing a texture descriptor for the restoration region pixel in the restoration region, wherein each texture descriptor comprises a sum of the pixel gradients of at least one of: pixels near a boundary of the restoration region; and pixels on the boundary of the restoration region, wherein the pixel gradients are determined relative to the restoration region pixel; and aggregating the texture descriptors to form the texture strength map.

23. The method of claim 22, wherein the sum of the pixel gradients is weighted according to a spatial relationship between the restoration region pixel and at least one of:

pixels near a boundary of the restoration region; and pixels on the boundary of the restoration region.

24. The method of claim 18, wherein applying an inpainting operation to pixels in the restoration region based on the texture strength map comprises applying, for the restoration region pixel, a patch matching operation to a current restoration region pixel based on a minimal difference in texture strength between the texture of the current restoration region pixel and a region outside of the restoration region.

25. The method of claim 18, wherein the texture characteristics comprise one of:

edge characteristics in the digital image;

contrast level characteristics in the digital image;

spatial frequencies associated with the restoration region; and pixel variances associated with the restoration region.

* * * * *